US007694778B2

(12) United States Patent
Toyoshima et al.

(10) Patent No.: US 7,694,778 B2
(45) Date of Patent: Apr. 13, 2010

(54) FUEL CELL VEHICLE

(75) Inventors: Tsutomu Toyoshima, Saitama (JP);
Hiroshi Saito, Saitama (JP); Haruki Imamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 11/292,054

(22) Filed: Nov. 30, 2005

(65) Prior Publication Data
US 2006/0113145 A1 Jun. 1, 2006

(30) Foreign Application Priority Data
Nov. 30, 2004 (JP) ............................. 2004-347749

(51) Int. Cl.
*F01N 1/08* (2006.01)
(52) U.S. Cl. ..................... 181/268; 181/252; 181/212; 181/222; 181/256
(58) Field of Classification Search ................. 181/268, 181/212, 225, 222, 252; 60/275
See application file for complete search history.

(56) References Cited

U.S. PATENT DOCUMENTS

| 701,496 | A | * | 6/1902 | McKinne ..................... 96/381 |
| 2,072,961 | A | * | 3/1937 | Nelson ....................... 181/256 |
| 2,995,199 | A | * | 8/1961 | Myers ........................ 181/256 |
| 3,771,315 | A | * | 11/1973 | Scott .......................... 60/297 |
| 4,079,810 | A | * | 3/1978 | Prather et al. ............... 181/266 |
| 4,109,755 | A | * | 8/1978 | Grueneberg ................ 181/256 |
| 4,269,800 | A | * | 5/1981 | Sommer et al. ............. 264/113 |
| 4,467,887 | A | * | 8/1984 | Vizard ........................ 181/265 |
| 4,580,656 | A | * | 4/1986 | Fukuda ....................... 181/252 |
| 4,673,058 | A | * | 6/1987 | Roberts et al. .............. 181/266 |
| 4,846,302 | A | * | 7/1989 | Hetherington .............. 181/243 |
| 5,025,890 | A | * | 6/1991 | Hisashige et al. ........... 181/272 |
| 5,266,755 | A | * | 11/1993 | Chien ......................... 181/252 |
| 5,365,025 | A | * | 11/1994 | Kraai et al. ................. 181/249 |
| 5,507,463 | A | * | 4/1996 | Kobylinski et al. ......... 248/610 |
| 5,912,441 | A | * | 6/1999 | Worner ....................... 181/282 |
| 6,451,465 | B1 | * | 9/2002 | Chalfant et al. .............. 429/20 |
| 7,004,283 | B2 | * | 2/2006 | Worner et al. .............. 181/239 |
| 7,100,603 | B1 | * | 9/2006 | Krasberg ................ 128/200.24 |
| 7,127,884 | B2 | * | 10/2006 | Worner et al. ................ 60/299 |
| 2002/0110710 | A1 | * | 8/2002 | Keskula et al. ............... 429/13 |
| 2004/0142221 | A1 | * | 7/2004 | Kawamura et al. ........... 429/24 |
| 2006/0040145 | A1 | * | 2/2006 | Tokumura et al. ............ 429/12 |
| 2006/0263658 | A1 | * | 11/2006 | Yanagi et al. ................. 429/22 |
| 2007/0178352 | A1 | * | 8/2007 | Jeon et al. .................... 429/34 |

FOREIGN PATENT DOCUMENTS

| JP | 402211316 | * | 8/1990 |
| JP | 408100627 | * | 4/1996 |
| JP | 2003-291657 | | 10/2003 |

* cited by examiner

*Primary Examiner*—Jeffrey Donels
*Assistant Examiner*—Forrest M Phillips
(74) *Attorney, Agent, or Firm*—Lahive & Cockfield, LLP; Anthony A. Laurentano

(57) ABSTRACT

An exhaust gas exhausted from a fuel cell is sent to a silencer through an exhaust pipe. The silencer is provided with a conductive noise absorbing material, and is fixed to a vehicle body through a metallic fixing jig. Thus, the noise absorbing material is earthed to the vehicle body so that it is possible to prevent static electricity from being generated in the use of the fuel cell vehicle such as in a low humidity environment.

23 Claims, 6 Drawing Sheets

FUEL CELL VEHICLE

The present invention claims foreign priority to Japanese patent application no. 2004-347749, filed on Nov. 30, 2004, the subject matter of which is incorporated herein by reference.

BACKGROUND OF THE INVENTION

1. Field of the Invention

The present invention relates to a fuel cell vehicle provided with a silencer for reducing an exhaust noise exhausted from a fuel cell.

2. Description of the Related Art

As a fuel cell used for a fuel cell vehicle, a PEM (Proton Exchange Membrane) fuel cell which employs solid polymer as an electrolyte membrane is commonly adopted. In this kind of fuel cell vehicle, power generation is carried out by the electrochemical reaction between air and hydrogen within the fuel cell. The air not used for the power generation is externally exhausted through an exhaust pipe together with water created by the electrochemical reaction. Further, since the fuel cell is supplied with high pressure air, the high pressure exhaust gas flows through the exhaust pipe. Therefore, the exhaust pipe is provided with a silencer for reducing a noise (see Japanese Patent Unexamined Publication JP-A-2003-291657 for example).

However, since a thin electrolyte membrane partitions an anode electrode (hydrogen electrode) and a cathode electrode (oxygen electrode) as for the solid polymer electrolyte fuel cell, the hydrogen supplied to the anode electrode permeates the cathode electrode via electrolyte membrane. As a result, the exhaust gas may contain a minute amount of hydrogen. For such a portion which may contain hydrogen, there has been a demand for solving a problem of a static electricity being generated in a condition such as dry environment.

SUMMARY OF THE INVENTION

In view of above problem, one of objects of the present invention is to provide a fuel cell vehicle that removes, by a simple configuration, the static electricity which may be generated, particularly in an exhaust pipe of a fuel cell vehicle.

According to a first aspect of the present invention, there is provided a fuel cell vehicle including a vehicle body, a fuel cell for generating an electric power through electrochemical reaction between a fuel gas and an oxidizer gas, an exhaust pipe for exhausting an exhaust gas exhausted from the fuel cell, a silencer for absorbing an exhaust noise due to the exhaust gas, and a conductive noise absorbing material provided within the silencer. The conductive noise absorbing material is earthed to the vehicle body.

Therefore, the static electricity which may be generated in the exhaust pipe can be dissipated to the vehicle body.

According to a second aspect of the present invention, as set forth in the first aspect of the present invention, it is preferable that the silencer include a silencer body, and a noise absorbing pipe. The noise absorbing pipe is communicated with the exhaust pipe and housed within in the silencer body. The noise absorbing pipe is provided with the conductive noise absorbing material on the periphery thereof, the conductive noise absorbing material being earthed to the vehicle body via the silencer body.

According to a third aspect of the present invention, as set forth in the second aspect of the present invention, it is preferable that the noise absorbing pipe have a plurality of through-holes on a pipe wall thereof.

In such a configuration, not only the static electricity generated in the exhaust pipe can be dissipated to the vehicle body but also the exhaust noise due to the exhaust gas can be absorbed effectively and quickly.

According to a fourth aspect of the present invention, as set forth in the second aspect of the present invention, it is preferable that the silencer body include a pair of end walls, at least one of the end walls being provided with the noise absorbing material so that the noise absorbing effect can be further enhanced.

According to a fifth aspect of the present invention, as set forth in the third aspect of the present invention, it is preferable that the pipe wall be provided with a pair of slits, a portion of the pipe wall placed between the pair of slits being outwardly bent into a curved shape so as to serve the pair of slits as the through-hole. In such a configuration, since the exhaust gas smoothly flows along the curved surface of the portion placed between the pair of slits outwardly from the noise absorbing pipe. Therefore, the noise absorbing effect when the noise being absorbed by the noise absorbing material can be further enhanced.

According to a sixth aspect of the present invention, as set forth in the fourth aspect of the present invention, it is preferable that silencer further include a first separator arranged parallel to the end walls within the silencer body, a second separator arranged parallel to the end walls within the silencer body, a first muffling chamber formed between one of the end wall and the first separator, a second muffling chamber formed between the first separator and the second separator, and a third muffling chamber formed between the second separator and the other end wall.

According to a seventh aspect of the present invention, as set forth in the first aspect of the present invention, it is preferable that the noise absorbing material include stainless steel.

According to an eighth aspect of the present invention, as set forth in the first aspect of the present invention, it is preferable that the noise absorbing material include carbon.

According to a ninth aspect of the present invention, as set forth in the first aspect of the present invention, it is preferable that the silencer and the vehicle body be fixed by a conductive fixing jig.

According to a tenth aspect of the present invention, there is provided a silencer for a fuel cell vehicle including a silencer body, and a noise absorbing pipe. The noise absorbing pipe is communicated with the exhaust pipe of a fuel cell and housed within in the silencer body. The noise absorbing pipe is provided with the conductive noise absorbing material on the periphery thereof, the conductive noise absorbing material being earthed to a vehicle body via a silencer body.

According to an eleventh aspect of the present invention, as set forth in the tenth aspect of the present invention, it is preferable that the noise absorbing pipe have a plurality of through-holes on a pipe wall thereof.

According to a twelfth aspect of the present invention, as set forth in the tenth aspect of the present invention, it is preferable that the silencer body include a cylindrical shell having a pair of end walls, at least one of the end walls being provided with the noise absorbing material so that the noise absorbing effect can be further enhanced.

According to a thirteenth aspect of the present invention, as set forth in the eleventh aspect of the present invention, it is preferable that the pipe wall be provided with a pair of slits, a portion of the pipe wall placed between the pair of slits being outwardly bent into a curved shape so as to serve the pair of slits as the through-hole. In such a configuration, since the exhaust gas smoothly flows along the curved surface of the portion placed between the pair of slits outwardly from the noise absorbing pipe. Therefore, the noise absorbing effect when the noise being absorbed by the noise absorbing material can be further enhanced.

According to a fourteenth aspect of the present invention, as set forth in the fourth aspect of the present invention, it is preferable that silencer further include a first separator arranged parallel to the end walls within the silencer body, a second separator arranged parallel to the end walls within the silencer body, a first muffling chamber formed between one of the end wall and the first separator, a second muffling chamber formed between the first separator and the second separator, and a third muffling chamber formed between the second separator and the other end wall.

According to a fifteenth aspect of the present invention, as set forth in the tenth aspect of the present invention, it is preferable that the noise absorbing material include stainless steel.

According to a sixteenth aspect of the present invention, as set forth in the tenth aspect of the present invention, it is preferable that the noise absorbing material include carbon.

According to a seventeenth aspect of the present invention, as set forth in the tenth aspect of the present invention, it is preferable that the silencer and the vehicle body be fixed by a conductive fixing jig.

In accordance with the above described aspects of the present invention, the exhaust noise of the exhaust gas can be reduced in a simple configuration. In addition, since the silencer is provided with the conductive noise absorbing material in a state of conductive noise absorbing material being earthed to the vehicle body, the static electricity which may be generated in the exhaust pipe can be dissipated to the vehicle body, thereby preventing the static electricity from accumulating in the exhaust pipe.

DETAILED DESCRIPTION OF THE PREFERRED EMBODIMENT

Figure 1:
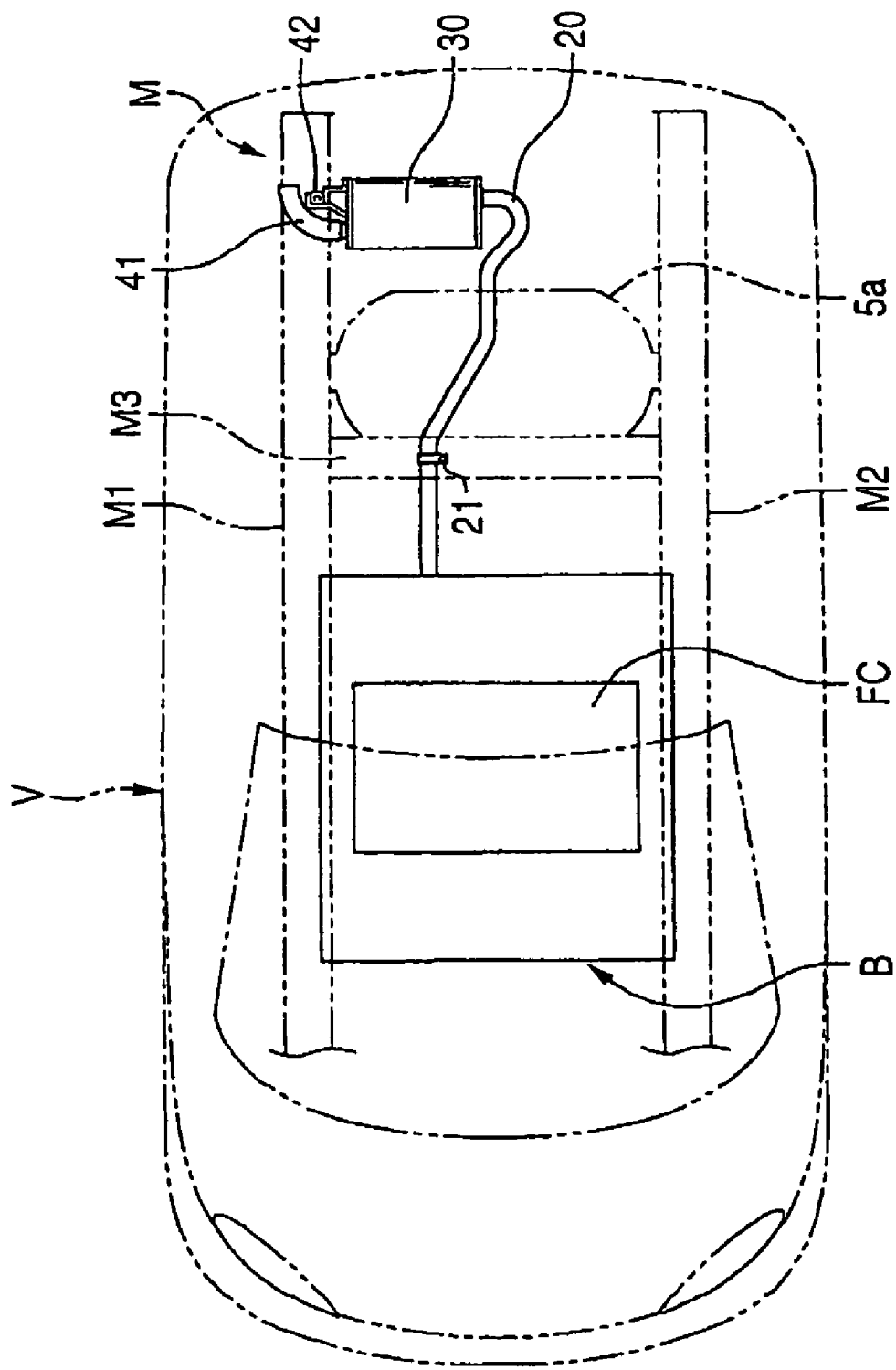
FIG. 1 is a schematic view of an embodiment of a fuel cell vehicle of the present invention.

As seen from FIG. 1, an embodiment of a fuel cell vehicle V of the present invention includes a fuel cell FC, an exhaust pipe 20 and a silencer 30. The fuel cell vehicle V has a vehicle body M including a pair of side members M1, M2 extending in a longitudinal direction of the vehicle on both sides and a cross member M3.

The fuel cell FC is provided in an underfloor region at the midsection of the fuel cell vehicle V, being housed in a fuel cell system box B which is fixed to the side members M1, M2 at the bottom thereof. The fuel cell system box B houses not only the fuel cell FC but also a diluter 10 (see FIG. 2) and a humidifier (not shown), which will be described later. The fuel cell FC is a PEM fuel cell having a plurality of cell units being stacked. Each of the cell units has a structure in which, as seen from FIG. 2, an electrolyte membrane 2 made of ion conducting solid polymer is sandwiched by an anode electrode 3 and a cathode electrode 4 on both sides thereof and further sandwiched by a pair of separators (not shown) on the outer side of the electrodes. Incidentally, the separator facing the anode electrode 3 is supplied with a hydrogen gas (fuel gas) from a hydrogen supplying system 5 through an anode gas pipe 3a, whereas the separator facing the cathode electrode 4a is supplied with air (oxidizer gas) from an air supplying system 6 through a cathode gas pipe 4a. In this process, power generation is carried out by an electrochemical reaction. By the electrochemical reaction, water is created on the cathode electrode 4 side. Further, the separator not shown is provided with a flow path along which a cooling medium circulates so as to cool the heat created during the power generation of the fuel cell FC, thereby maintaining the temperature of the fuel cell FC at about 80° C.

The hydrogen supplying system 5 includes a hydrogen tank 5a equipped with an electromagnetically operated cut-off valve (not shown) and filled with highly purified hydrogen at high pressure, a pressure reducing valve 5b for reducing the pressure of the hydrogen supplied from the hydrogen tank 5a, an ejector 5c for recycling circulated hydrogen, a purge valve 5d. Incidentally, the hydrogen tank 5a is fixed onto a frame (not shown), the frame being fixed at the lower side of the vehicle body M.

The air supplying system 6 includes a compressor 6a for compressing air taken in from outside the vehicle and supplying the compressed air to the fuel cell FC, an inter cooler (not shown) for cooling the compressed air supplied from the compressor 6a, a humidifier (not shown) for humidifying the compressed air cooled by the inter cooler.

Figure 2:
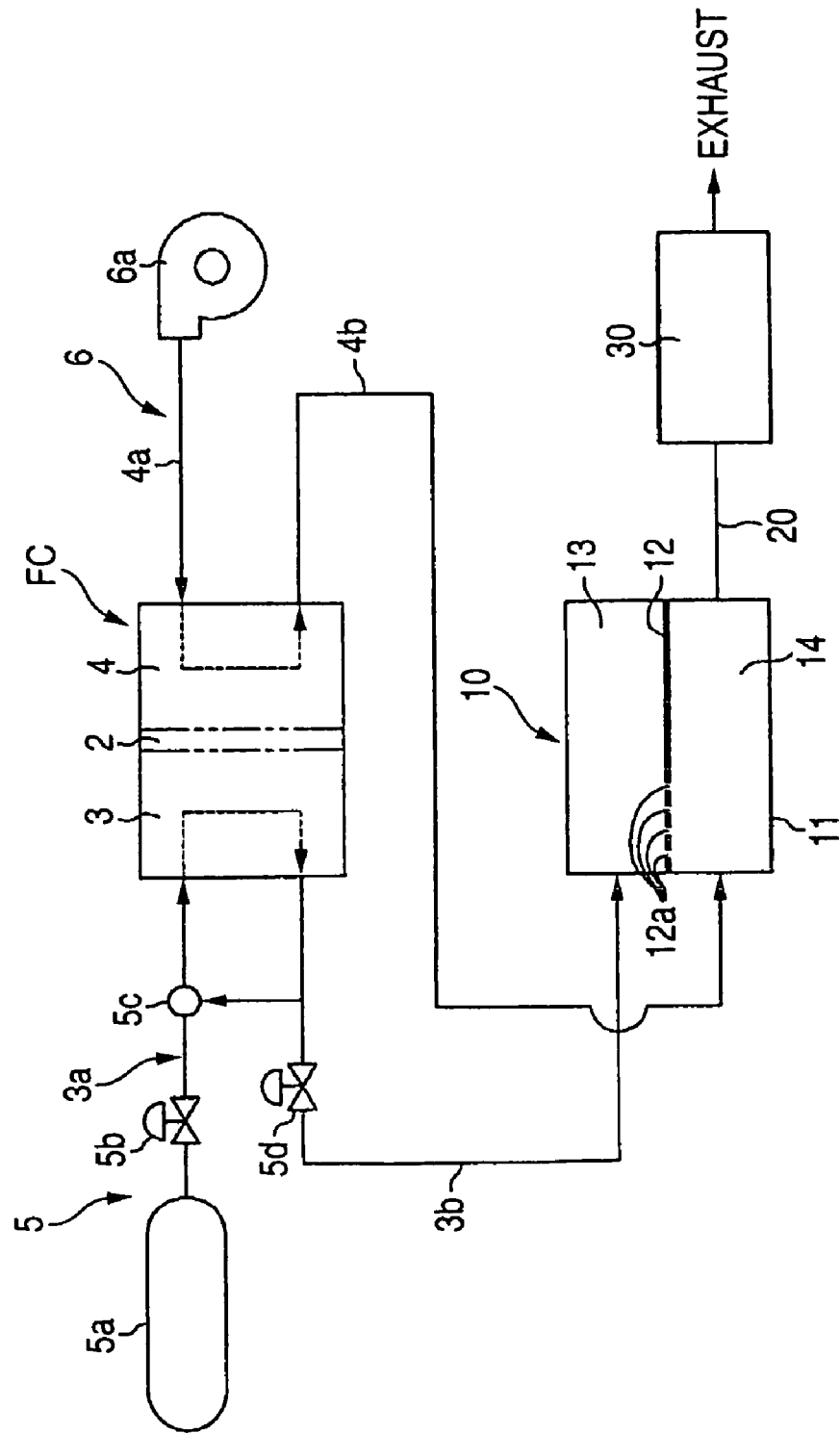
FIG. 2 is a diagram of a fuel cell system of a fuel cell vehicle.

As seen from FIG. 2, the diluter 10 has a box-shape vessel 11 having a retention region 13 on the upper side, a dilution region 14 on the lower side and a communicating wall 12 interposed therebetween. The retention region 13 is connected to an anode-off gas pipe 3b of the fuel cell FC, whereas the dilution region 14 is connected to a cathode-off gas pipe 4b of the fuel cell FC. Further, the communicating wall 12 has a plurality of holes 12a formed on a portion thereof, which communicate the retention region 13 and the dilution region 14.

In the retention region 13, the hydrogen exhausted from the fuel cell FC flows through the anode-gas off pipe 3b at the time of purge processing. The purge processing is carried out intermittently by opening the purge valve 5d on the anode-off gas pipe 3b. In the dilution region 14, the air exhausted from the fuel cell FC flows through the cathode-off gas pipe 4b. The hydrogen in the retention region 13 moves into the dilution region 14 through the holes 12a and is diluted by being mixed with the air in the dilution region 14. Incidentally, the purge processing is a hydrogen releasing process carried out in order to prevent the output power from being lowered owing to the impurities. Such impurities can be nitrogen contained in the air moved from the cathode electrode 4 to the anode electrode 3 through the electrolyte membrane 2 and/or the water created by the reaction.

The exhaust pipe 20 is formed and is extended from the fuel cell system box B toward the rear section of the fuel cell vehicle V (vehicle body M), as shown in FIG. 1. The one end of the exhaust pipe 20 is connected to the dilution region 14 of the diluter 10 whereas the other end thereof is connected to the silencer 30. More specifically, the exhaust pipe 20 is arranged to pass the lower side of the frame (not shown) supporting the hydrogen tank 5a. The exhaust pipe 20 is made of metal such as stainless steel, and is fixed to the cross member M3 of the vehicle body M using a jig 21. Incidentally, the exhaust pipe 20 may be fixed at a plurality of points.

Figure 3:
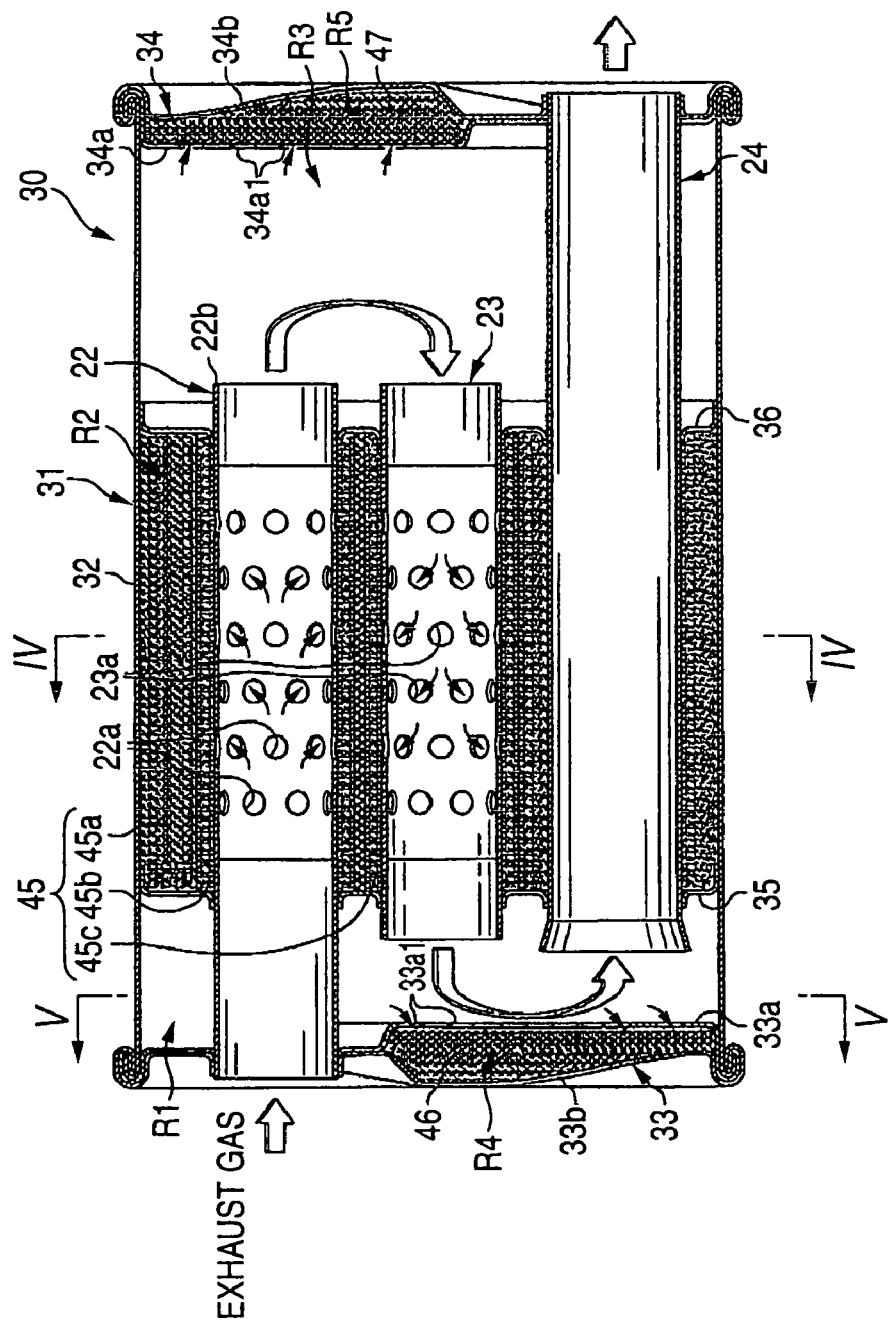
FIG. 3 is a sectional view of a silencer.

As seen from FIG. 3, the silencer 30 has a silencer body including a cylindrical shell 32 having a pair of openings at the end and a pair of end walls 33, 34 occluding both openings of the shell 32. The internal space of the silencer body 31 is separated into three regions by a first separator 35 and a second separator 36. The first separator 35 and the second separator 36 are arranged in parallel to the end walls 33, 34. A first muffling chamber R1 is formed between the first separator 35 and the end wall 33, a second muffling chamber R2 is formed between the second separator 36 and the first separator 35, a third muffling chamber R3 is formed between the second separator 36 and the end wall 34.

Further, the silencer 30 is provided with an exhaust flow-in pipe (noise absorbing pipe) 22 communicating with the exhaust pipe 20 (see FIG. 1), an inner pipe 23, and an exhaust flow-out pipe 24 communicating with a tailpipe 41 (see FIG. 1) extending to the outside of the vehicle. Incidentally, the exhaust flow-in pipe 22 is communicated with the exhaust pipe 20 by junction between their metal parts.

The exhaust flow-in pipe 22 penetrates through the end wall 33, the first separator 35 and the second separator 36 so as to communicate with the third muffling chamber R3. The exhaust flow-in pipe 22 has a number of transmitting-holes 22a formed in on a pipe wall 22b in an area where passes through the second muffling chamber R2.

The inner pipe 23 penetrates through the first separator 35 and the second separator 36 so as to communicate the first muffling chamber R1 with the third muffling chamber R3. The inner pipe 23 has a number of transmitting-holes 23a formed in an area where passes through the second muffling chamber R2. The inner pipe 23 communicates with the exhaust flow-in pipe 22 and the second muffling chamber R2 through the transmitting-holes 23a.

The exhaust flow-out pipe 24 penetrates through the first separator 35, second separator 36, and end wall 34 so as to communicate the first muffling chamber R1 with the outside of the vehicle.

In such a configuration as described above, there are two flowing paths of the exhaust gas flowed in the exhaust flow-in pipe 22. One path reaches the exhaust flow-out pipe 24 via third muffling chamber R3, inner pipe 23 and the first muffling chamber R1, whereas another path reaches the exhaust flow-out pipe 24 via transmitting-holes 22a, second muffling chamber R2, transmitting-holes 23a, inner pipe 23 and the first muffling chamber R1.

Figure 5:
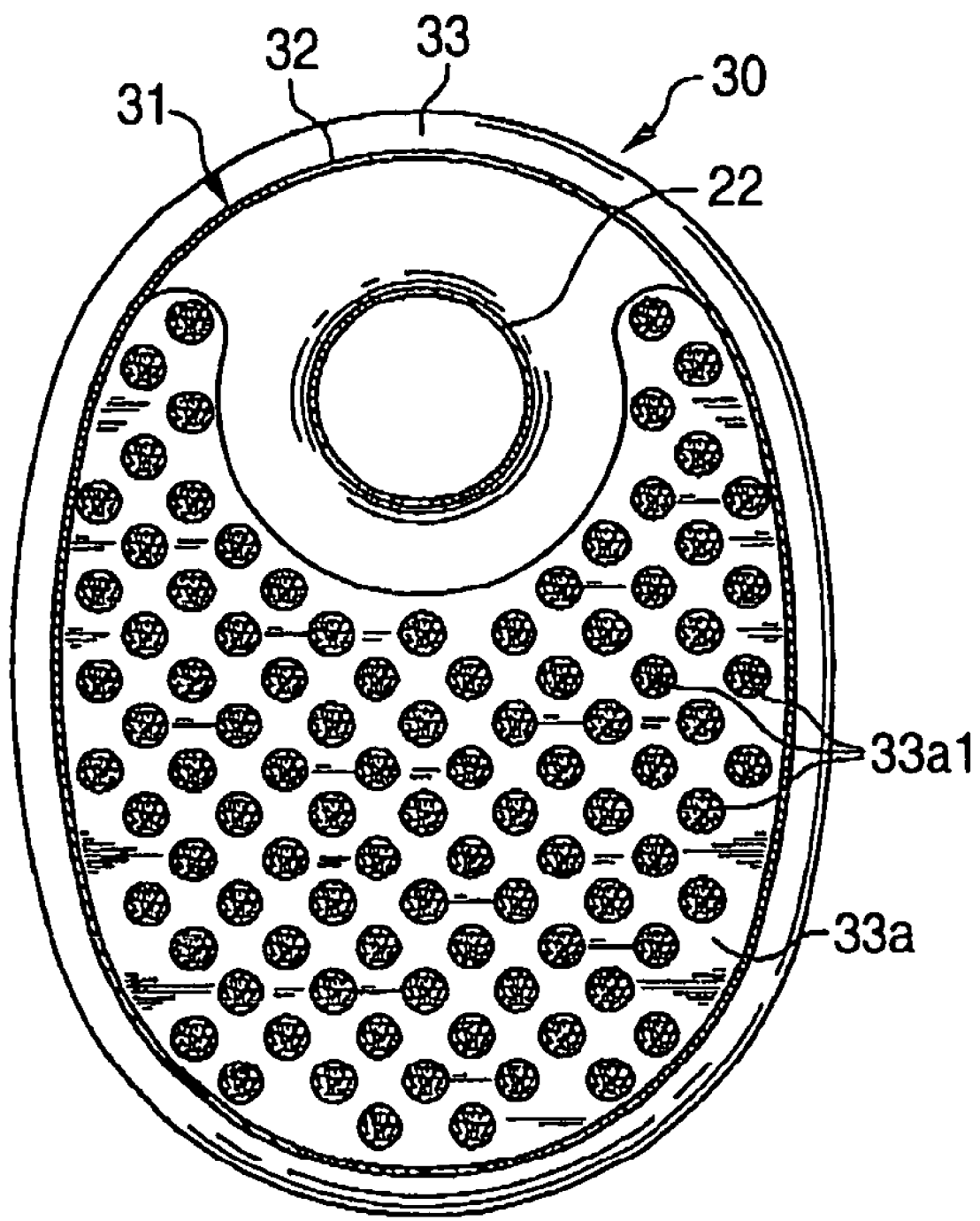
FIG. 5 is a sectional view taken in line V-V in FIG. 3.

The end wall 33 has a plate member 33a and a plate member 33b facing each other, and between which a fourth muffling chamber R4 is formed. The plate member 33a has a plurality of transmitting-holes 33a1 formed on the portion corresponding to the fourth muffling chamber R4 (see FIG. 5) so as to communicate with the fourth muffling chamber R4. Incidentally, just like the end wall 33, the end wall 34 forms a fifth muffling chamber R5 between plate members 34a, 34b and has a plurality of transmitting-holes 34a1. The fifth muffling chamber R5 and the fourth muffling chamber R4 are arranged upside down from each other as can be seen from FIG. 3.

In the silencer 30 according to this embodiment, the electrically conductive noise absorbing materials 45, 46, 47 are provided in the second muffling chamber R2, fourth muffling chamber R4 and fifth muffling chamber R5. These noise absorbing materials 45, 46, 47 can be selected from stainless wool made from stainless steel fiber, carbon-series fiber, conductive fiber, etc. The conductive fiber is a synthetic fiber such as nylon and polyester of which the surface is coated with conductive filler such as carbon black, or of which the interior is filled with conductive filler. Incidentally, a plurality of electrically conductive noise absorbing materials may be mixed. Further, the outer periphery of the exhaust flow-out pipe 24 may be previously wrapped by the electrically conductive noise absorbing material having a predetermined thickness.

Figure 4:
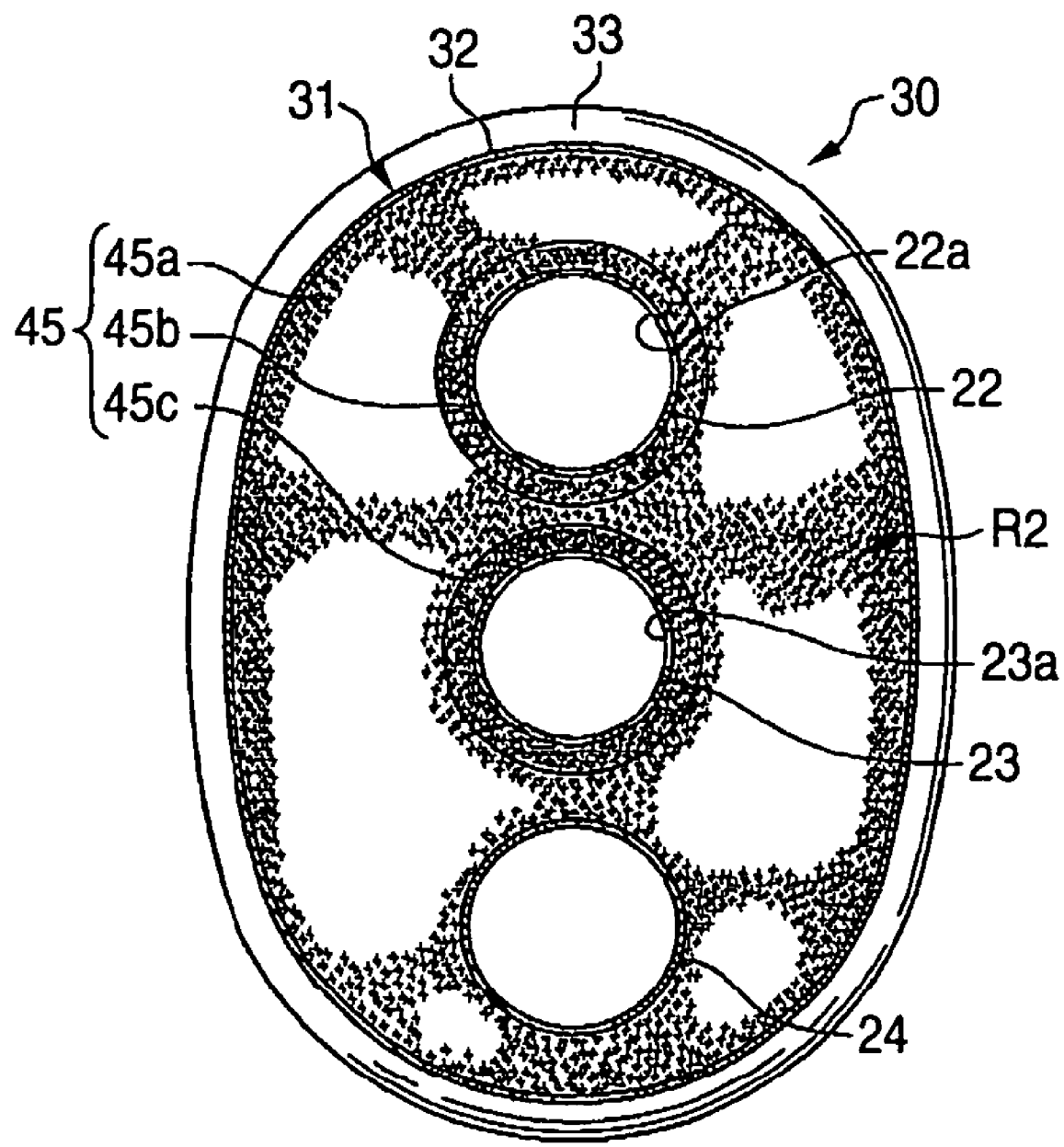
FIG. 4 is a sectional view taken in line IV-IV in FIG. 3.

Additionally, as seen from FIGS. 3 and 4, in the second muffling chamber R2, the periphery of the exhaust flow-in pipe 22 is previously wrapped by an electrically conductive noise absorbing material 45b having a predetermined thickness, and the periphery of the inner pipe 23 is also previously wrapped in an electrically conductive noise absorbing material 45c having a predetermined thickness. Thereafter, the vacant gap of the second muffling chamber R2, i.e. the periphery of the noise absorbing materials 45b, 45c and the periphery of the exhaust flow-out pipe 24 are filled with a noise absorbing material 45a. Thus, the noise absorbing materials 45b, 45c can be provided so as to cover each of the transmitting-holes 22a, 23a, so that the exhaust gas flowing out of the transmitting-holes 22a of the flow-in pipe 22 and the transmitting-holes 23a of the inner pipe 23 can be surely absorbed into the noise absorbing materials 45b, 45c. Therefore, the noise absorbing effect can be prevented from being lowered.

Further, as seen from FIG. 1, the silencer 30 is fixed to the vehicle body M by a screw using a metallic fixing jig 42. In this case, the metallic portion of the fixing jig 42 is fixed to be in contact with the metallic portion of the vehicle body M (side member M1) and the metallic portion of the silencer 30. So the silencer 30 is electrically connected with the vehicle body M through the fixing jig 42. Incidentally, in this embodiment, the fixing jig 42 is fixed to the side member M1, but may be fixed to the other member, i.e., a sub-frame not shown. Further, the fixing jig may be fixed at a plurality of positions.

Next, referring to FIGS. 1 to 3, an explanation will be given of the operation in the fuel cell vehicle according to this embodiment. In the fuel cell vehicle V, when the air at a high pressure (e.g. several thousand kPa) compressed by the compressor 6a is supplied to the fuel cell FC, the exhaust gas at a high pressure is also exhausted from the fuel cell FC. The exhausted gas from the fuel cell FC containing hydrogen, the hydrogen being exhausted in the purge processing and diluted by the diluter 10, is sent to the exhaust pipe 20.

The exhaust gas from the exhaust pipe 20, as seen from FIG. 3, flows into the exhaust flow-in pipe 22 of the silencer 30. As described above, in the path which reaches the exhaust flow-out pipe 24 via the third muffling chamber R3, inner pipe 23, and first muffling chamber R1, the exhaust noise is reduced by the third muffling chamber R3 and the first muffling chamber R1. Moreover, the exhaust gas flowed in the third muffling chamber R3 is subjected to the exhaust noise reduction by the noise absorbing material 47 provided in the fifth muffling chamber R5 through the transmitting-holes 34a1 and the exhaust gas flowed in the first muffling chamber R1 is subjected to the exhaust noise reduction by the noise absorbing material 46 provided in the fourth muffling chamber R4 through the transmitting-holes 33a1. As for the path which reaches the exhaust flow-in pipe 24 via transmitting-holes 22a, second muffling chamber R2, transmitting-holes 23a, inner pipe 23 and the first muffling chamber R1, the exhaust noise is reduced by the second muffling chamber R2 and the first muffling chamber R1. Moreover, the exhaust gas flowed in the second muffling chamber R2 from the transmitting-hole 22a is subjected to the exhaust noise reduction by the noise absorbing material 45b and noise absorbing material 45a, and the exhaust gas flowed in the second muffling chamber R2 from the transmitting-holes 23a is subjected to the exhaust noise reduction by the noise absorbing material 45c and the noise absorbing material 45a. The exhaust gas flowed in the exhaust flow-out pipe 24 is exhausted from the vehicle through the tailpipe 41 (see FIG. 1).

By designing the fuel cell vehicle so that the exhaust gas passes through the silencer 30, the noise in a wide range of frequency can be reduced by the first to fifth muffling chambers R1 to R5. Further, the noise at a specific frequency can be reduced by resonance through the transmitting-holes 22a, 23a. The noise due to friction can be also reduced by the noise absorbing materials 45 to 47.

Meanwhile, when the fuel cell vehicle V is used in a low humidity environment such as a cold district or a cold period of time, static electricity is likely to be generated. However, in this embodiment, the electrically conductive noise absorbing materials 45 to 47 are provided within the silencer 30. The noise absorbing materials 45 to 47 are kept in contact with the shell 32 of the silencer 30, and the silencer 30 is earthed to the vehicle body M through the electrically conductive jig 42. In accordance with such a configuration, it is possible to prevent static electricity from being generated or accumulated in the exhaust pipe 20 and silencer 30.

Figure 6:
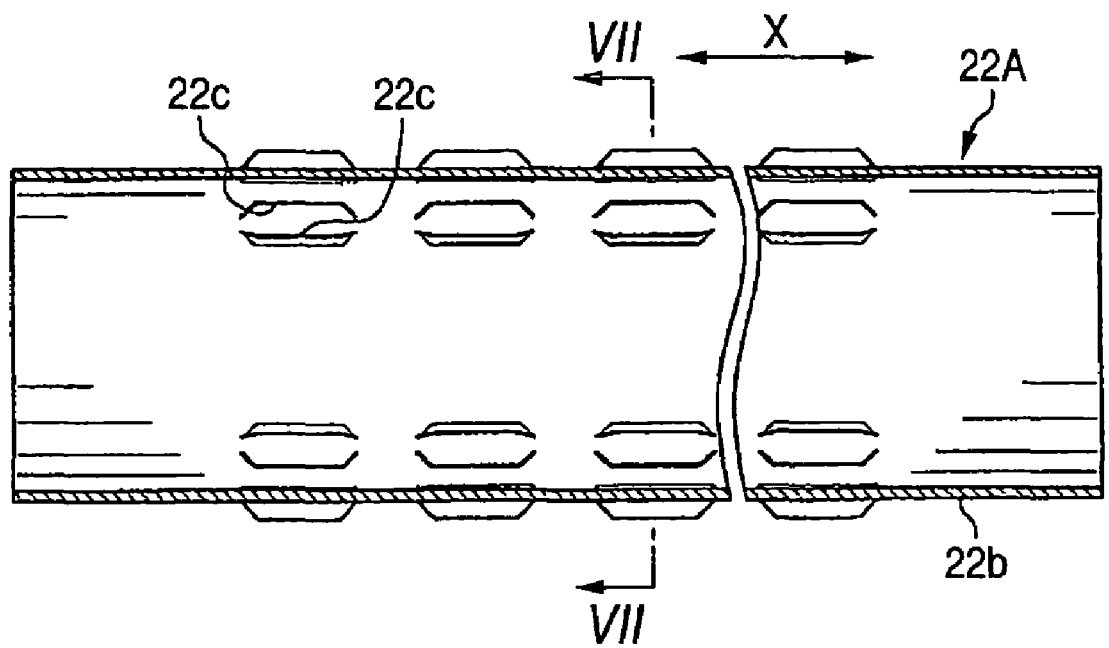
FIG. 6 is a sectional view of a modification of through-holes.
Figure 7:
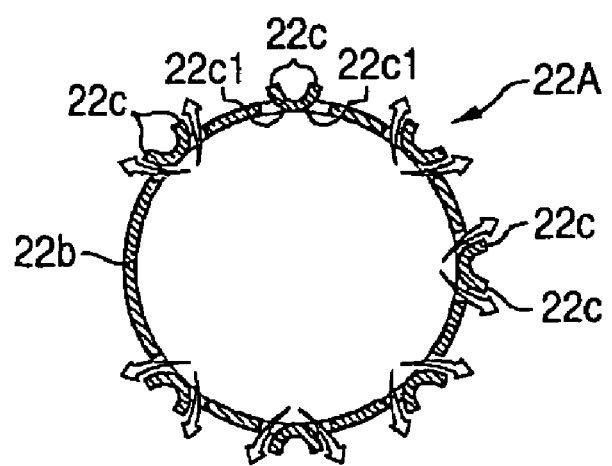
FIG. 7 is a vertical sectional view taken in line VII-VII in FIG. 5.

FIG. 6 is a sectional view of a noise absorbing pipe showing a modification of through-holes. FIG. 7 is a vertical sectional view taken in line VII-VII in FIG. 6.

As seen from FIGS. 6 and 7, the exhaust flow-in pipe (noise absorbing pipe) 22A has pairs of trapezoidal slits 22c formed on a pipe wall 22b. The pairs of slits are formed at regular intervals in an X direction and at regular angles in a circumferential direction, but partially not formed. The slit 22c is formed by cutting the pipe wall 22b substantially in a C-shape, and the pair of slits is formed by two of the C-shaped slits facing each other. The portion placed between the pair slits 22c are outwardly bent in a curved shape. Namely, as seen from FIG. 7, the portion placed between the pair of slits 22c is formed in a U-shape to provide curved surface 22c1. Incidentally, for example, the pairs of slits 22c can be formed in the portion where the noise absorbing pipe passes through the second muffling chamber R2. The slits 22c may not necessarily be formed in pairs.

By providing the pair of slits 22c, the exhaust gas introduced into the exhaust flow-in pipe 22A from the exhaust pipe 20 flows out from the transmitting-holes formed at the slits 22c as indicated by arrows in FIG. 7. In this case, the exhaust gas smoothly flows along the curves 22c1 of the slits 22c, and then flows into the noise absorbing material 45, so that the noise absorbing effect by the noise absorbing material 45 can be further enhanced.

In addition, in the case of the silencer 30 according to this embodiment being employed for the fuel cell vehicle V, the temperature of the fuel cell FC is kept at about 80° C. while driving. Therefore, the noise absorbing material such as carbon can be adopted, which have not been adopted to a silencer of the vehicle having an internal combustion engine because of its low heat resistance.

Incidentally, the pairs of slits 22c can be applied to not only the exhaust flow-in pipe 22, but to both the exhaust flow-in pipe 22 and the inner pipe 23, to only the inner pipe 23 or to the plate members 33a, 34a of the end walls 33, 34. Further, the arrangement of the exhaust flow-in pipe 22, inner pipe 23 and the exhaust flow out pipe 24 should not be limited to that in the embodiment described-above. The exhaust-flow-out pipe 24 may be arranged at the center whereas the flow-in pipe 22 and inner pipe 23 may be arranged on both sides thereof.

While there has been described in connection with the preferred embodiments of the present invention, it will be obvious to those skilled in the art that various changes and modifications may be made therein without departing from the present invention. It is aimed, therefore, to cover in the appended claims all such changes and modifications as fall within the true spirit and scope of the present invention.

What is claimed is:

1. A fuel cell vehicle comprising:
   a vehicle body;
   a fuel cell for generating an electric power through an electrochemical reaction between a fuel gas and an oxidizer gas;
   an exhaust pipe for exhausting an exhaust gas exhausted from the fuel cell; and
   a silencer in communication with the exhaust pipe for reducing an exhaust noise due to the exhaust gas, the silencer and the vehicle body are fixed by a conductive fixing jig, wherein the silencer comprises:
   a silencer body;
   an inner pipe provided within the silencer body;
   a noise absorbing pipe in communication with the exhaust pipe and housed within the silencer body, wherein the inner pipe and the noise absorbing pipe create first and second flowing paths of exhaust gas inside the silencer body; and
   a noise absorbing material provided within the silencer body,
   wherein the noise absorbing material is a conductive material grounded to the vehicle body,
   wherein the silencer body comprises a cylindrical shell having a pair of end walls provided at both openings thereof, each of said pair of end walls has a dual-plate structure,
   wherein a first portion of the noise absorbing material is provided between the dual plates of each of said pair of end walls, and
   wherein a plurality of transmitting holes is formed through a portion of said at least one of the pair of end walls facing the inner pipe.

2. The fuel cell vehicle according to claim 1, wherein the noise absorbing pipe is provided with a second portion of said noise absorbing material on a periphery thereof, and
   the noise absorbing material is grounded to the vehicle body via the silencer body.

3. The fuel cell vehicle according to claim 1, wherein the noise absorbing pipe has a plurality of through-holes on a pipe wall thereof.

4. The fuel cell vehicle according to claim 3, wherein the pipe wall is provided with a pair of slits, and
   a portion of the pipe wall placed between the pair of slits is outwardly bent into a curved shape so as to serve the pair of slits as the through-hole.

5. The fuel cell vehicle according to claim 1, wherein the silencer further comprises:
   a first separator arranged parallel to the end walls within the silencer body;
   a second separator arranged parallel to the end walls within the silencer body;
   a first muffling chamber formed between one of the end walls and the first separator;
   a second muffling chamber formed between the first separator and the second separator wherein a second portion of the noise absorbing material is provided inside the second muffling chamber; and
   a third muffling chamber formed between the second separator and the other end wall.

6. The fuel cell vehicle according to claim 5,
   wherein the fuel cell vehicle further comprises a tailpipe extending to an outside of the fuel cell vehicle,
   wherein the silencer further comprises an exhaust flow-out pipe in communication with tailpipe, and wherein the exhaust gas flows along the first flowing path by passing through the noise absorbing pipe, the third muffling chamber, the inner pipe, the first muffling chamber and the exhaust flow-out pipe.

7. The fuel cell vehicle according to claim 5,
wherein the fuel cell vehicle further comprises a tailpipe extending to an outside of the fuel cell vehicle,
wherein the silencer further comprises an exhaust flow-out pipe in communication with tailpipe, and
wherein the noise absorbing pipe has a plurality of through-holes formed on a wall thereof;
wherein the inner pipe has a plurality of through-holes formed on a wall thereof; and
wherein the exhaust gas flows along the second flowing path by passing through the noise absorbing pipe, the plurality of through-holes of the noise absorbing pipe, the second muffling chamber, the plurality of through-holes of the inner pipe, the inner pipe, the first muffling chamber and the exhaust flow-out pipe.

8. The fuel cell vehicle according to claim 1, wherein the noise absorbing material includes stainless steel.

9. The fuel cell vehicle according to claim 1, wherein the noise absorbing material includes carbon.

10. The fuel cell vehicle according to claim 7, wherein the exhaust gas also flows along the first flowing path by passing through the noise absorbing pipe, the third muffling chamber, the inner pipe, the first muffling chamber and the exhaust flow-out pipe.

11. The fuel cell vehicle according to claim 1, wherein the noise absorbing material includes at least one of nylon and polyester.

12. The fuel cell vehicle according to claim 1, wherein the plurality of transmitting holes faces the noise absorbing pipe.

13. A silencer for a fuel cell vehicle comprising:
a silencer body;
an inner pipe provided within the silencer body; and
a noise absorbing pipe in communication with an exhaust pipe of a fuel cell and housed within in the silencer body,
wherein the inner pipe and the noise absorbing pipe create first and second flowing paths of exhaust gas inside the silencer body,
wherein the noise absorbing pipe is provided with a noise absorbing material on a periphery thereof,
wherein the noise absorbing material is a conductive material grounded to a vehicle body via the silencer body, and
wherein the silencer and the vehicle body are fixed by a conductive fixing jig,
wherein the silencer body comprises a cylindrical shell having a pair of end walls provided at both openings thereof, each of said pair of end walls has a dual-plate structure,
wherein a first portion of the noise absorbing material is provided between the dual plates of each of said pair of end walls, and
wherein a plurality of transmitting holes is formed through a portion of said at least one of the pair of end walls facing the inner pipe.

14. The silencer for a fuel cell vehicle according to claim 13, wherein the noise absorbing pipe has a plurality of through-holes on a pipe wall thereof.

15. The silencer for a fuel cell vehicle according to claim 14, wherein the pipe wall is provided with a pair of slits, and a portion of the pipe wall placed between the pair of slits is outwardly bent into a curved shape so as to serve the pair of slits as the through-hole.

16. The silencer for a fuel cell vehicle according to claim 13, wherein the silencer further comprises:
a first separator arranged parallel to the end walls within the silencer body;
a second separator arranged parallel to the end walls within the silencer body;
a first muffling chamber formed between one of the end walls and the first separator;
a second muffling chamber formed between the first separator and the second separator, wherein a second portion of the noise absorbing material is provided inside the second muffling chamber; and
a third muffling chamber formed between the second separator and the other end wall.

17. The silencer for a fuel cell vehicle according to claim 16, further comprising an exhaust flow-out pipe in communication with an outside of the silencer,
wherein the exhaust gas flows along the first flowing path by passing through the noise absorbing pipe, the third muffling chamber, the inner pipe, the first muffling chamber and the exhaust flow-out pipe.

18. The silencer for a fuel cell vehicle according to claim 16, further comprising an exhaust flow-out pipe in communication with an outside of the silencer,
wherein the noise absorbing pipe has a plurality of through-holes formed on a wall thereof;
wherein the inner pipe has a plurality of through-holes formed on a wall thereof; and
wherein the exhaust gas flows along the second flowing path by passing through the noise absorbing pipe, the plurality of through-holes of the noise absorbing pipe, the second muffling chamber, the plurality of through-holes of the inner pipe, the inner pipe, the first muffling chamber and the exhaust flow-out pipe.

19. The silencer for a fuel cell vehicle according to claim 18, wherein the exhaust gas also flows along the first flowing path by passing through the noise absorbing pipe, the third muffling chamber, the inner pipe, the first muffling chamber and the exhaust flow-out pipe.

20. The silencer for a fuel cell vehicle according to claim 13, wherein the noise absorbing material includes stainless steel.

21. The silencer for a fuel cell vehicle according to claim 13, wherein the noise absorbing material includes carbon.

22. The silencer for a fuel cell vehicle according to claim 13, wherein the noise absorbing material includes at least one of nylon and polyester.

23. The silencer for a fuel cell vehicle according to claim 13, wherein the plurality of transmitting holes faces the noise absorbing pipe.

* * * * *